(12) United States Patent
Nishimura et al.

(10) Patent No.: US 10,978,925 B2
(45) Date of Patent: Apr. 13, 2021

(54) STATOR OF ROTARY ELECTRIC MACHINE AND METHOD OF MANUFACTURING STATOR COIL

(71) Applicant: Toyota Jidosha Kabushiki Kaisha, Toyota Aichi-ken (JP)

(72) Inventors: Masahiro Nishimura, Toyota Aichi-ken (JP); Masashi Matsumoto, Nagoya Aichi-ken (JP)

(73) Assignee: Toyota Jidosha Kabushiki Kaisha, Toyota Aichi-ken (JP)

( * ) Notice: Subject to any disclaimer, the term of this patent is extended or adjusted under 35 U.S.C. 154(b) by 141 days.

(21) Appl. No.: 16/209,409

(22) Filed: Dec. 4, 2018

(65) Prior Publication Data

US 2019/0199153 A1 Jun. 27, 2019

(30) Foreign Application Priority Data

Dec. 27, 2017 (JP) .............................. JP2017-251716

(51) Int. Cl.
| | |
|---|---|
| *H02K 3/12* | (2006.01) |
| *H02K 15/04* | (2006.01) |
| *B23K 35/02* | (2006.01) |
| *H02K 3/38* | (2006.01) |
| *H02K 15/00* | (2006.01) |
| *B23K 26/21* | (2014.01) |
| *B23K 33/00* | (2006.01) |
| *B23K 26/00* | (2014.01) |

(52) U.S. Cl.
CPC .............. *H02K 3/12* (2013.01); *B23K 26/21* (2015.10); *B23K 33/00* (2013.01); *B23K 35/0255* (2013.01); *H02K 3/38* (2013.01); *H02K 15/0081* (2013.01); *B23K 26/00* (2013.01)

(58) Field of Classification Search
CPC ........ H02K 3/12; H02K 3/38; H02K 15/0081; H02K 3/04; H02K 15/04; H02K 3/00–3/528; B23K 26/21; B23K 33/00; B23K 35/0255; B23K 26/00
USPC ................................ 310/179, 180, 184, 208
See application file for complete search history.

(56) References Cited

U.S. PATENT DOCUMENTS

| | | | |
|---|---|---|---|
| 6,865,796 B1 | 3/2005 | Oohashi et al. | |
| 2002/0041129 A1 | 4/2002 | Oohashi et al. | |
| 2004/0046475 A1 | 3/2004 | Holzheu et al. | |
| 2015/0214820 A1* | 7/2015 | Geoffrion | H02K 15/0068 |
| | | | 219/85.22 |
| 2017/0237321 A1 | 8/2017 | Baba et al. | |

FOREIGN PATENT DOCUMENTS

| | | |
|---|---|---|
| CN | 1520006 A | 8/2004 |
| JP | 2000-262021 A | 9/2000 |
| JP | 4462392 B2 | 5/2010 |
| JP | 2012-179631 A | 9/2012 |
| JP | 2014-007795 A | 1/2014 |
| JP | 2015-201966 A | 11/2015 |

* cited by examiner

*Primary Examiner* — Thomas Truong
(74) *Attorney, Agent, or Firm* — Dinsmore & Shohl LLP

(57) ABSTRACT

A stator includes a stator core, and a stator coil wound around the stator core. The stator coil includes a firm segment coil and a second segment coil. A first peeled portion that is present in an end portion of the first segment coil is joined to a second peeled portion of the second segment coil. At least one recess portion is provided in a joining surface of the first peeled portion, which faces the second peeled portion.

19 Claims, 7 Drawing Sheets

STATOR OF ROTARY ELECTRIC MACHINE AND METHOD OF MANUFACTURING STATOR COIL

CROSS-REFERENCE TO RELATED APPLICATIONS

This application claims priority to Japanese Patent Application No. 2017-251716 filed on Dec. 27, 2017, which is incorporated herein by reference in its entirety including the specification, drawings and abstract.

BACKGROUND

1. Technical Field

The disclosure relates to a stator of a rotary electric machine, which includes a stator core and a stator coil wound around the stator core, and a method of manufacturing a stator coil.

2. Description of Related Art

In the related art, a segment conductor type stator in which a stator coil is configured by joining a plurality of segment coils to each other is known. For example, Japanese Unexamined Patent Application Publication No. 2015-201966 (JP 2015-201966 A) discloses a technique to configure a stator coil by inserting a segment coil having a U-shape into each slot of a stator core and then welding an end portion of the segment coil to an end portion of another segment coil (in the specification, the term "U-shape" includes the meaning of an "approximate U-shape").

As types of welding when joining segment coils to each other, tungsten inert gas (TIG) welding, laser welding, or the like is known. The TIG welding is a type of arc welding using electricity. The TIG welding is heat conduction type welding in which the surface of a material generates heat due to the collision of electrons and a molten pool grows due to the conduction of the heat of the surface. In the TIG welding, a heat-affected range is wide, and therefore, in a case of welding a segment coil with the TIG welding, a peeled portion in which an insulating film is peeled off for joining, of the segment coil, has to be enlarged. Enlarging the peeled portion in which the insulating film is peeled off is disadvantageous for the downsizing of a stator.

The laser welding is to melt and join a material by increasing the temperature of the material to a temperature equal to or higher than a melting point with a laser having high energy density. In the laser welding, solely a reachable range of the laser energy rises in temperature and a thermal influence on other places is small. For this reason, in a case of welding a segment coil with the laser welding, it is possible to reduce a heat-affected range while a sufficient joining area is secured. Therefore, it is possible to make the peeled portion smaller, and as a result, it is possible to downsize a stator.

SUMMARY

The peeled portion of the segment coil is welded to another peeled portion. A joining region that is joined to another peeled portion and a non-joining region that is not joined to another peeled portion are present in the joining surface, which faces another peeled portion, of the peeled portion. The boundary between the joining region and the non-joining region is a joining boundary. In the case of the laser welding, the joining boundary tends to have an uneven shape having a plurality of peaks.

The reason why the joining boundary tends to have the uneven shape having the peaks is that when the laser welding is performed, a laser light is oscillated so as to repeatedly straddle the boundary between two overlapped peeled portions. As a result of the oscillation, the reaching depth of the laser energy in the joining surface changes, and thus the joining boundary has the uneven shape. As described above, in a case where the joining boundary has the uneven shape having the peaks, a stress intensity factor of a joined portion increases, and thus cracking or deterioration of the joined portion easily occurs. In the case described above, it is difficult to secure the joining strength of the segment coil.

The disclosure provides a stator of a rotary electric machine and a method of manufacturing a stator coil, in which it is possible to further improve the joining strength between segment coils.

A first aspect of the disclosure relates to a stator of a rotary electric machine. The stator includes: a stator core; and a stator coil wound around the stator core. The stator coil includes a first segment coil and a second segment coil. A first peeled portion that is present in an end portion of the first segment coil is joined to a second peeled portion of the second segment coil, and at least one recess portion is provided in a joining surface of the first peeled portion faces the second peeled portion.

With the stator according to the first aspect of the disclosure, the shape of an end portion of a welded portion when two peeled portions have been welded to each other is controlled by the recess portion. In this way, a stress intensity factor of the welded portion is lowered, and thus cracking or breakage of the welded portion can be effectively reduced. As a result, it is possible to further improve joining strength between the first segment coil and the second segment coil.

In the stator according to the first aspect of the disclosure, the joining surface may include a joining region where the first segment coil is joined to the second segment coil, and a non-joining region where die first peeled portion and the second peeled portion face each other without joining of the first segment coil and the second segment coil, and the recess portion may be present in the vicinity of a joining boundary that is a boundary between the joining region and the non-joining region.

With the stator according to the first aspect of the disclosure, the recess portion is formed in the vicinity of the joining boundary, whereby it is possible to more reliably make the shape of the end portion of the welded portion, that is, the shape of the joining boundary, a shape with a smaller stress intensity factor. As a result, it is possible to more reliably improve the joining strength between the first segment coil and the second segment coil.

In the stator according to the first aspect of the disclosure, the joining region may be located further on the outside of the stator coil than the non-joining region in an axial direction of the stator.

With the stator according to the first aspect of the disclosure, welding energy for welding the peeled portion (for example, laser energy during laser welding) can be applied from the outside of the stator coil in the axial direction of the stator, and therefore, it is possible to suppress interference between the welding energy and other members.

In the stator according to the first aspect of the disclosure, the recess portion may have a linear or arc shape and extends in a direction crossing the axial direction (in the specification, the term "arc shape" includes the meaning of an "approximate arc shape").

With the stator according to the first aspect of the disclosure, during welding, variation in the reaching depth of the welding energy (for example, laser energy during laser welding) in the joining surface can be absorbed by the recess portion, and thus it is possible to further reduce the stress intensity factor of the joining boundary.

In the stator according to the first aspect of the disclosure, a plurality of the recess portions may be provided in the joining surface, and the recess portions may be provided such that the recess portions are arranged at intervals in the axial direction.

With the stator according to the first aspect of the disclosure, even though the amplitude of variation in the reaching depth of the welding energy is large or the reaching depth deviates from an estimate, it can be absorbed by the recess portions, and thus it is possible to more reliably reduce the stress intensity factor of the joining boundary.

In the stator according to the first aspect of the disclosure, at least one recess portion may be present in a surface of the second peeled portion that faces the recess portion of the first peeled portion.

A second aspect of the disclosure relates to a method of manufacturing a stator coil. The method includes: forming a first peeled portion at an end portion of a first segment coil that is included in the stator coil, and also forming at least one recess portion in the first peeled portion, an insulating film of the first segment coil that is peeled off in the first peeled portion; and welding the first peeled portion to a second peeled portion such that the recess portion faces the second peeled portion, in a state where the first peeled portion overlaps the second peeled portion, the second peeled portion being at an end portion of a second segment coil that is included in the stator coil.

With the method according to the second aspect of the disclosure, the shape of an end portion of a welded portion when two peeled portions have been welded to each other is controlled by the recess portion. In this way, a stress intensity factor of the welded portion is lowered, and thus cracking or breakage of the welded portion can be effectively reduced. As a result, it is possible to further improve the joining strength between the first segment coil and the second segment coil.

In the method according to the second aspect of the disclosure, the first peeled portion and the second peeled portion may be welded to each other with laser welding.

With the method according to the second aspect of the disclosure, due to the welding with the laser welding, it is possible to minimize a thermal influence on portions other than the welded portion. For this reason, it is possible to minimize the peeled portion, and thus it is possible to downsize the stator.

In the method according to the second aspect of the disclosure, in the laser welding, a laser light may have laser energy that melts materials of the first peeled portion and the second peeled portion, and the recess portion may be formed in the vicinity of an end portion of a range of each of the first peeled portion and the second peeled portion, and the laser energy may reach the range of each of the first peeled portion and the second peeled portion.

With the method according to the second aspect of the disclosure, it is possible to more reliably make the shape of an end portion of the welded portion a shape with a smaller stress intensity factor. As a result, it is possible to more reliably improve the joining strength between the first segment coil and the second segment coil.

In the method according to the second aspect of the disclosure, in the laser welding, a laser light may be emitted from an outside of the stator coil in an axial direction of a stator to which the stator coil is assembled, and oscillated so as to repeatedly straddle a boundary where the first peeled portion and the second peeled portion overlap each other.

With the method according to the second aspect of the disclosure, it is possible to reliably melt a material around the joining surface and to reliably join the two peeled portions to each other.

With the stator and the method according to the first and second aspects of the disclosure, the shape of the end portion of the welded portion when the two peeled portions have been welded to each other is controlled by the recess portion. In this way, the stress intensity factor of the welded portion is lowered, and thus cracking or breakage of the welded portion can be effectively reduced. As a result, it is possible to further improve the joining strength between the first segment coil and the second segment coil.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
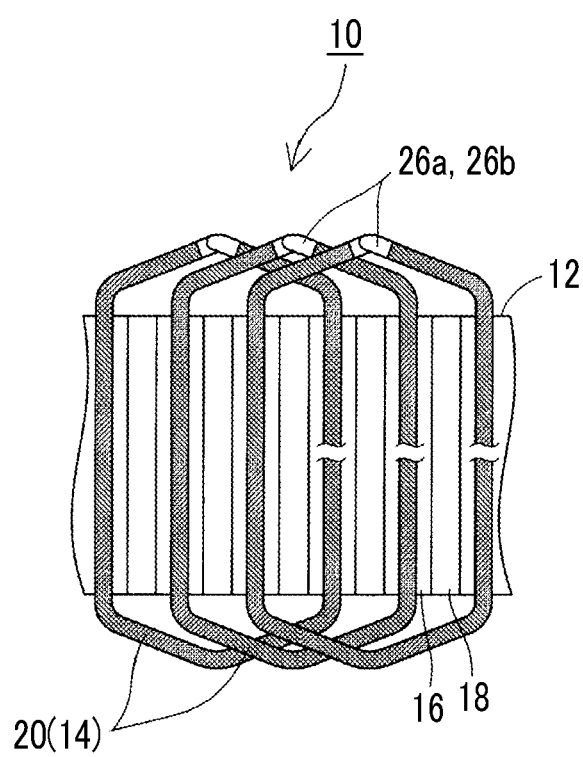
FIG. 1 is a partial perspective view of a stator of a rotary electric machine.

Hereinafter the configuration of a stator 10 of a rotary e emir machine will be described with reference to the drawings. FIG. 1 is a partial perspective view of the stator 10 of the rotary electric machine. In the following description, a "circumferential direction", an "axial direction", and a "radial direction" respectively refer to a circumferential direction, an axial direction, and a radial direction of the stator 10.

The stator 10 is combined with a rotor to configure a rotary electric machine. The rotary electric machine to which the stator 10 is applied is not particularly limited and may be used as an electric motor or may be used as a power generator. For example, the stator 10 may be applied to a rotary electric machine that is mounted on an electrified vehicle and functions as an electric motor that generates power for traveling and also functions as a power generator that generates electric power with a braking force or the like.

The stator 10 has a stator core 12 and a stator coil 14 wound around the stator core 12. The stator core 12 is a cylindrical member and includes an annular yoke and a plurality of teeth 18 protruding in the radial direction front the inner peripheral surface of the yoke (in the specification, the term "cylindrical member" includes the meaning of an "approximately cylindrical member"). The teeth 18 are arranged at a predetermined interval in the circumferential direction, and a slot 16 that is a space into which the stator coil 14 is inserted is formed between two teeth 18 adjacent to each other. The stator core 12 is composed of a plurality of electromagnetic steel sheets (for example, silicon steel sheets) laminated in the axial direction. The electromagnetic steel sheets are positioned and joined to each other to configure the stator core 12.

The stator coil 14 is configured by winding a winding around the teeth 18. A winding method and a connection method of the stator coil 14 may be appropriately and freely changed. Therefore, the stator coil 14 may be wound in distributed winding or may be wound in concentrated winding. In the stator coil 14, three-phase coils may be star-connected or may be delta-connected.

Figure 2:
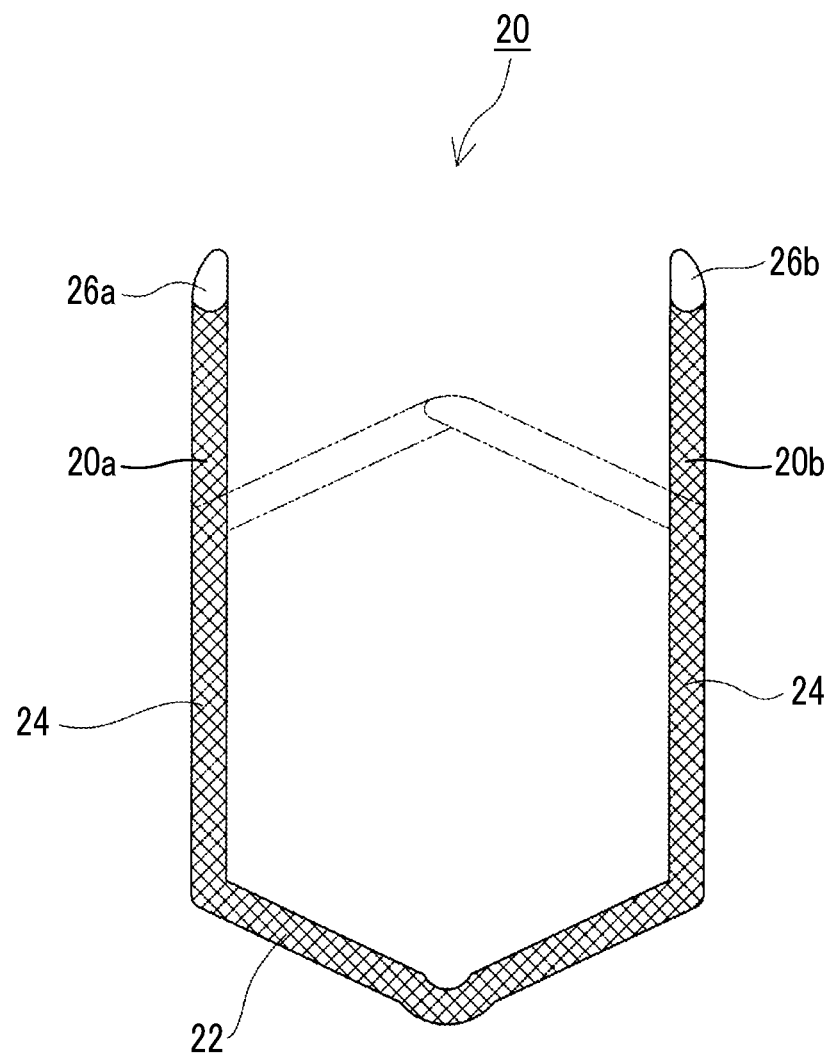
FIG. 2 is a diagram showing an example of a segment coil.

The stator coil 14 of this embodiment is configured with a segment coil 20 composed of a first segment coil 20a and a second segment coil 20b joined to each other. FIG. 2 is a diagram showing an example of the segment coil 20. The segment coil 20 is formed by bending and shaping a rectangular conductor having a rectangular cross section and covered with an insulating film (indicated by cross hatching in the drawing) into a U-shape (in the specification, the term "rectangular cross section" includes the meaning of an "approximately rectangular cross section"). The segment coil 20 has a pair of straight portions 24 and a connecting portion 22 connecting the straight portions 24, in a stage before the segment coil 20 is assembled to the stator core 12.

When the segment coil 20 is assembled to the stator core 12, the straight portions 24 are inserted into the slots 16, respectively. In this way, the connecting portion 22 extends in the circumferential direction so as to straddle one or more teeth 18 on a second end side in the axial direction of the stator core 12. After the straight portion 24 is inserted into the slot 16, the straight portion 24 is bent in the circumferential direction in the middle, as shown by a two-dot chain line in FIG. 2. In this way, the straight portion 24 is made so as to have a portion extending in the axial direction in the slot 16, and a portion extending in the circumferential direction on a first end side in the axial direction of the stator core 12. The portion extending in the circumferential direction configures a part of a coil end portion. In the following, the bending for making the segment coil 20 have a U-shape is referred to as "primary bending", and the bending that is performed after the segment coil 20 is assembled to the stator core 12 is referred to as "secondary bending".

A first peeled portion 26a and a second peeled portion 26b, in which the rectangular conductor is exposed to the outside by peeling off the insulating film, are formed at end portions of the first segment coil 20a and the second segment coil 20b, respectively. An edge at a first end in the width direction of each of the first peeled portion 26a and the second peeled portion 26b, that is, an edge that is an outer edge in the axial direction when each of the first segment coil 20a and the second segment coil 20b has been secondarily bent, is formed in an outwardly convex arc shape. In FIG. 2, an example in which both the straight portions 24 are secondarily bent inward in the circumferential direction is shown. For this reason, both the first peeled portion 26a and the second peeled portion 26b are formed in an arc shape at the outer edges in a width direction. However, each straight portion 24 may be secondarily bent to the opposite side (outward in the circumferential direction). In the case described above, the shape of the end portions in the width direction of each of the first peeled portion 26a and the second peeled portion 26b may also be appropriately changed according to a direction of the secondary bending.

Figure 3:
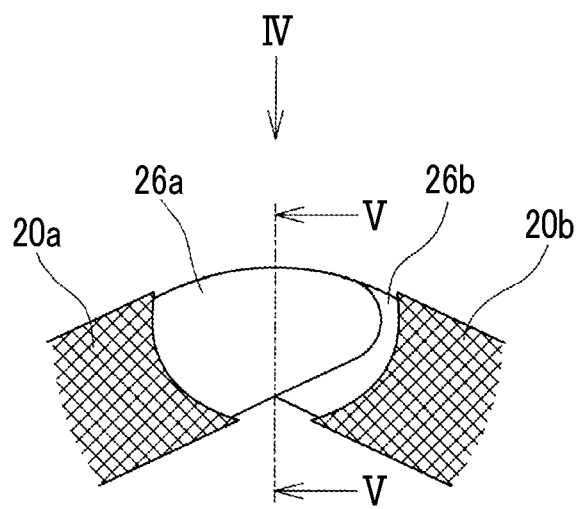
FIG. 3 is a diagram showing a periphery of a peeled portion.
Figure 4:
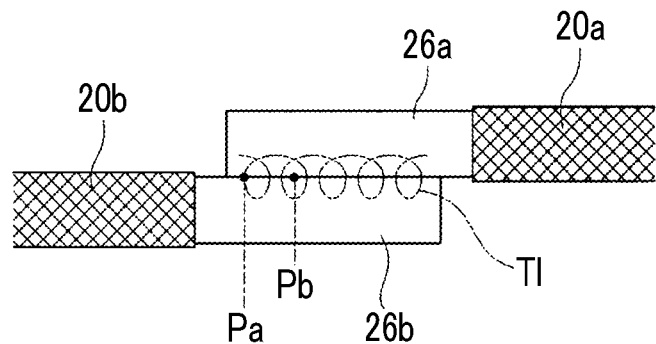
FIG. 4 is a view of the periphery of the peeled portion as viewed from an arrow IV in FIG. 3.
Figure 5:
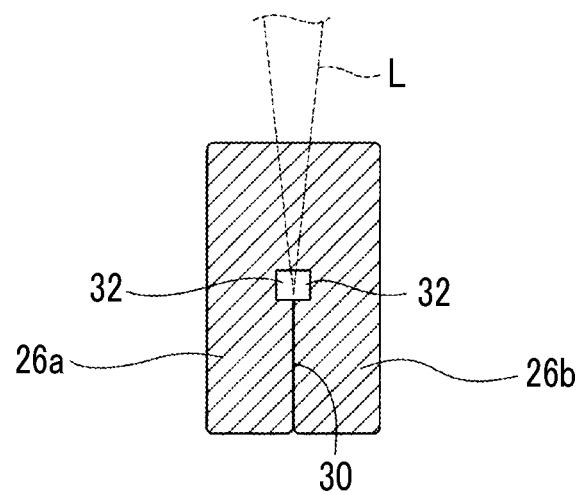
FIG. 5 is a schematic sectional view taken along line V-V in FIG. 3.
Figure 6:
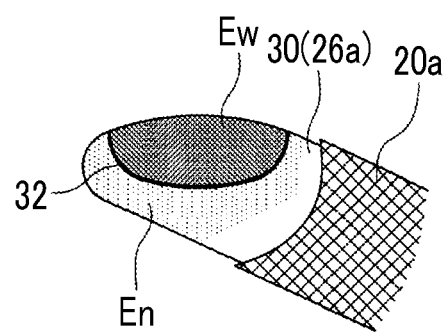
FIG. 6 is a diagram in which the illustration of the segment coil on the near side in FIG. 3 is omitted.

The first peeled portion 26a of the first segment coil 20a is welded and joined to the second peeled portion 26b of the second segment coil 20b after the secondary bending. The configuration of the periphery of the first peeled portion 26a and the second peeled portion 26b will be described with reference to FIG. 3 to FIG. 6. FIG. 3 is a diagram showing the periphery of the first peeled portion 26a and the second peeled portion 26b joined to each other. FIG. 4 is a view of the periphery of the first peeled portion 26a and the second peeled portion 26b as viewed from a direction of an arrow IV in FIG. 3 (the axial direction). FIG. 5 is a schematic sectional view taken along line V-V in FIG. 3. FIG. 6 is a diagram in which the illustration of the first segment coil 20a on the near side, of the first segment coil 20a and the second segment coil 20b to be joined to each other, is omitted.

As shown in FIG. 4, the first peeled portion 26a and the second peeled portion 26b are welded and joined to each other in a state of being overlapped in a thickness direction of the peeled portion. In this case, the first peeled portion 26a and the second peeled portion 26b overlap such that the arc-shaped edge portions of the first peeled portion 26a and the second peeled portion 26b coincide with each other, as shown in FIG. 3. In the following, the surface of the first peeled portion 26a, which faces and is joined to the second peeled portion 26b, is referred to as a "joining surface 30".

Solely a portion on the upper side of the joining surface 30 is joined to the second peeled portion 26b. In the following, a region that is joined to the second peeled portion 26b is referred to as a "joining region Ew". In FIG. 6, dark black hatching indicates the joining region Ew. A region of the joining surface 30, which faces the second peeled portion 26b but is not joined to the second peeled portion 26b, is referred to as a "non joining region En". In FIG. 6, thin black hatching indicates the non-joining region En.

In this embodiment, a recess portion 32 recessed in the thickness direction is provided in the vicinity of a boundary, that is, a joining boundary, between the joining region Ew and the non-joining region En in the joining surface 30. The recess portion 32 has an arc shape that is convex downward in the axial direction, as shown in FIG. 6. Both ends of the recess portion 32 reach the upper end edge of the second peeled portion 26b (a first end in the width direction of the second segment coil 20*b*). The recess portion 32 is provided in order to make the joining boundary smooth, and this will be described later.

Welding of the first peeled portion 26*a* and the second peeled portion 26*b* is performed by laser welding. Due to the welding with the laser welding, a range in which the insulating film is peeled off, that is, the first peeled portion 26*a* and the second peeled portion 26*b* can be reduced, and thus the stator 10 can be downsized. That is, as a welding form, in addition to the laser welding, arc welding, particularly TIG welding, or the like is known. The TIG welding is hear conduction type welding in which the surface of a material generates heat and a molten pool grows due to the conduction of the heat of the surface. In the TIG welding, a heat-affected range is wide, and therefore, in a case of welding the first segment coil 20*a* and the second segment coil 20*b* with the TIG welding, the first peeled portion 26*a* and the second peeled portion 26*b*, in which the insulating films are peeled off, of the first segment coil 20*a* and the second segment coil 20*b*, have to be enlarged. This hinders the downsizing of the stator 10. On the other hand, in the laser welding, a material is melted and joined by increasing the temperature of the material to a temperature equal to or higher than a melting point (partly, a temperature equal to or higher than a boiling point) with a laser having high energy density. In the laser welding, solely a range where the laser energy having sufficient intensity has actually reached is melted, and the thermal influence on other portions is small. For this reason, in a case of welding the first segment coil 20*a* and the second segment coil 20*b* with the laser welding, the insulating film needs to be peeled off solely in the vicinity of a portion to be welded. As a result, it is possible to make the first peeled portion 26*a* and the second peeled portion 26*b* smaller, and eventually, it is possible to downsize the stator 10.

Here, when performing the laser welding, a laser light L is emitted toward the first peeled portion 26*a* and the second peeled portion 26*b* from the outside in the axial direction, as indicated by a broken line in FIG. 5. When performing the laser welding, the laser light L is oscillated so as to repeatedly traverse the boundary between the first peeled portion 26*a* and the second peeled portion 26*b* that are overlapped. In FIG. 4, a two-dot chain line indicates a movement locus TI of the laser light L. In the example of FIG. 4, the laser light L two-dimensionally moves along the movement locus TI such as a locus formed by ellipses connected continuously. However, the movement locus TI shown here is an example, and as long as it is a movement locus that repeatedly traverse the boundary between the first peeled portion 26*a* and the second peeled portion 26*b*, it may be a zigzag shape, a wave shape, or the like.

In any case, the optical axis of the laser light L repeats approach and separation with respect to the boundary between the first peeled portion 26*a* and the second peeled portion 26*b* in the course of moving in a long axial direction of the first segment coil 20*a* and the second segment coil 20*b* (the right left direction in FIG. 4). As a result, reaching depth of the laser energy in the joining surface 30 changes according to the positions in the long axial direction of the first segment coil 20*a* and the second segment coil 20*b*. That is, at a position Pa where the optical axis of the laser light L passes just above the boundary between the first peeled portion 26*a* and the second peeled portion 26*b*, the reaching depth of the laser energy in the joining surface 30 becomes deeper. On the other hand, at a position Pb where the optical axis of the laser light L is separated from the boundary between the first peeled portion 26*a* and the second peeled portion 26*b*, the reaching depth of the laser energy in the joining surface 30 becomes shallower. That is, variation in the reaching depth of the laser energy in the joining surface 30 easily occurs.

Figure 17:
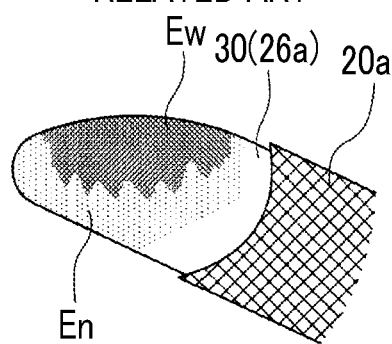
FIG. 17 is a diagram showing an example of a peeled portion in the related art.

Here, in a case where the recess portion 32 is not present in the joining surface 30, the reachable range of the laser energy is a range in which a material is melted and joined. Then, in a case where the recess portion 32 is not present in the joining surface 30, the joining boundary that is the boundary between the joining region Ew and the non-joining region En has an uneven shape having a plurality of peaks. FIG. 17 is a diagram showing an example of the joining region Ew and the non-joining region En in a case where the recess portion 32 is not present in the joining surface 30. As shown in FIG. 17, an end portion (a joining boundary) of the joining region Ew where a material is melted and joined to the second peeled portion 26*b* has the uneven shape in which repeated peaks are generated. As described above, when the joining boundary has the uneven shape, a stress intensity factor increases, and thus cracking or breakage of a welded portion easily occurs. As a result, it becomes difficult to secure coil joining strength.

In this embodiment, in order to make the joining boundary have a shape with few peaks, the recess portion 32 is provided in the vicinity of an end portion of the reachable range of the laser energy in the joining surface 30. Of course, a material does not exist in the interior of the recess portion 32. Therefore, even though the laser energy reaches the recess portion 32, a material is in a "vain attempt" without welding. Then, in this way, the joining boundary has a smooth shape with few peaks, and thus it becomes easy to secure the coil joining strength.

Figure 7:
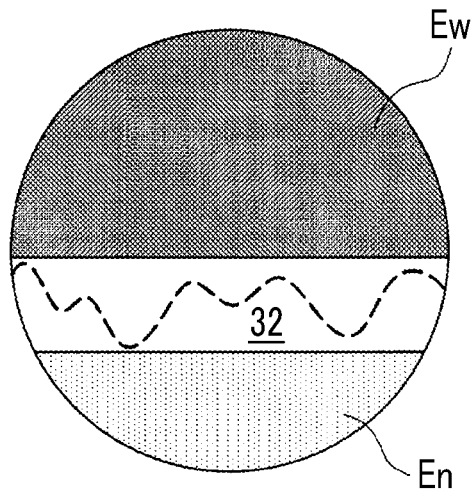
FIG. 7 is an image diagram describing a relationship between a reachable range of laser energy and a welding region.
Figure 8:
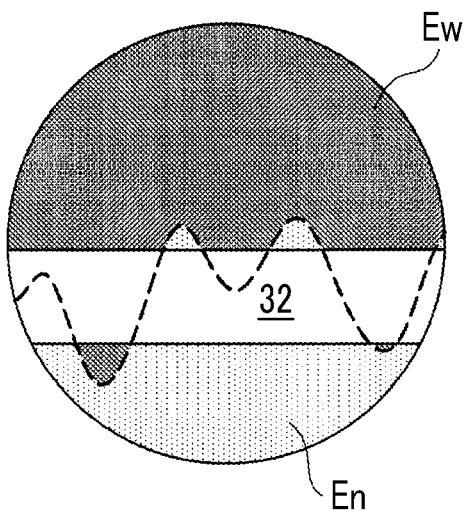
FIG. 8 is another image diagram describing the relationship between the reachable range of laser energy and the welding region.

This will be described with reference to FIG. 7 and FIG. 8. FIG. 7 and FIG. 8 are enlarged views of the periphery of the recess portion 32. In FIG. 7 and FIG. 8, a broken line indicates the end portion of the reachable range of the laser energy capable of melting a material. As described above, the reaching depth of the laser energy has variation, and therefore, the end portion of the reachable range of the laser energy has the uneven shape having the peaks, as indicated by a broken line in FIG. 7. Originally, the material of the joining surface 30 melts along the uneven shape. However, as shown in FIG. 7, in a case where the amplitude of the end portion of the reachable range of the laser energy falls within the width of the recess portion 32, in the joining surface 30, solely the material on the upper side of the recess portion 32 melts and the material on the lower side of the recess portion 32 does not melt. A material does not exist within the width of the recess portion 32, naturally, a material does not melt within the width of the recess portion 32. As a result, the boundary (joining boundary) between the joining region Ew and the non-joining region En is in accordance with the shape of the recess portion 32. Here, the recess portion 32 has the smooth shape without the peaks, and therefore, the obtained joining boundary (the end portion of the joining region Ew) also has the smooth shape without the peaks. As a result, the stress intensity factor in the joining boundary can be suppressed to a small value, and thus it is possible to secure the joining strength with sufficient strength.

Of course, as shown in FIG. 8, it is also conceivable that some of the laser energy does not reach the recess portion 32 or protrudes further toward the back side than the recess portion 32. However, even in the case described above, most of the end portion of the joining region Ew is in accordance with the shape of the recess portion 32. Therefore, even in the case described above, the stress intensity factor can be reduced as compared with a case where there is no recess portion 32, and thus the joining strength can be further increased.

As is apparent from the above description, the recess portion 32 is provided in order to control the shape of the joining boundary. Then, in order to more reliably control the joining boundary, it is desirable that the width D (refer to FIG. 7) of the recess portion 32 is equal to or larger than the amplitude A of the end portion of the reachable range of the laser energy. However, of course, even though the width D of the recess portion 32 is smaller than the amplitude A of the end portion of the reachable range of the laser energy, the stress intensity factor can be reduced as compared with a case where there is no recess portion 32, as shown in FIG. 8. The depth of the recess portion 32 is not limited. However, it is desirable that the depth of the recess portion 32 is set to a depth to the extent that the surrounding material does not overflow even though it melts and flows and to the extent that the strength of the first peeled portion 26a and the second peeled portion 26b can be sufficiently maintained. The sectional shape of the recess portion 32 may be a rectangular shape, as shown in FIG. 5, or may be a mountain shape, a semicircular shape, or the like.

Figure 9:
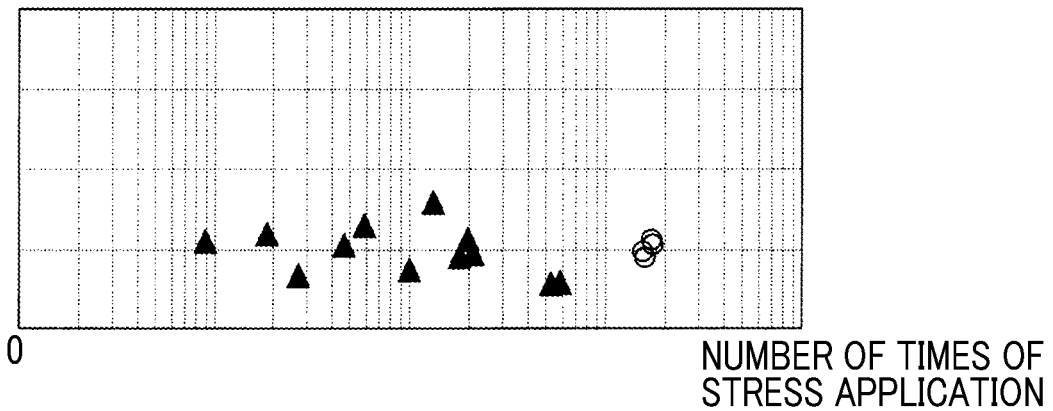
FIG. 9 is a diagram showing results of the experiment in which joining strength of the peeled portion is measured.

FIG. 9 is a diagram showing the results of the experiment in which the joining strength of the first peeled portion 26a and the second peeled portion 26b is measured. In the experiment, stress is repeatedly applied to the first peeled portion 26a and the second peeled portion 26b, and the number of times of stress application until the joining is destroyed is measured. In FIG. 9, the vertical axis represents the average value of the stress applied to the first peeled portion 26a and the second peeled portion 26b, and the horizontal axis represents the number of times of stress application. The scale on the horizontal axis is a logarithmic scale, as is apparent from the interval between auxiliary lines. In FIG. 9, black triangles represent the experimental results of the first peeled portion 26a and the second peeled portion 26b in which the recess portion 32 is not provided, and white circles represent the experimental results of the first peeled portion 26a and the second peeled portion 26b in a ease where the recess portion 32 is provided.

As shown in FIG. 9, in a case where the recess portion 32 is not provided (the black triangle), there is large variation in the number of times of stress application until joint breakage occurs. It is thought that this is because the shape of the joining boundary is not controlled, so that the magnitude of the stress intensity factor tends to be influenced by chance. On the other hand, in a case where the recess portion 32 is provided (the white circle), the number of times of stress application until joint breakage occurs greatly increases as compared with a case where the recess portion 32 is not provided (the black triangle). Further, variation in the number of times of stress application is also small. It is thought that this is because the shape of the joining boundary is controlled by the recess portion 32 to a shape having a small stress intensity factor in any case, as is apparent from FIG. 9, by providing the recess portion 32, it is possible to maintain the joining strength higher.

Figure 10:
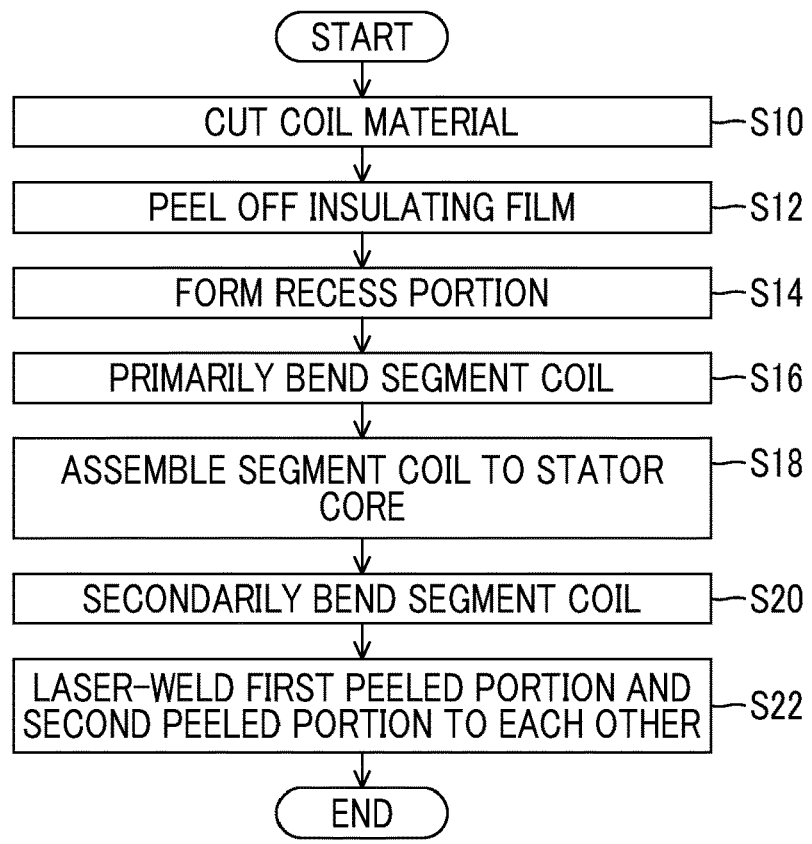
FIG. 10 is a flowchart showing a flow of manufacturing of a stator coil.

The flow of manufacturing of the stator coil 14 will be described with reference to FIG. 10. FIG. 10 is a flowchart showing the flow of manufacturing of the stator coil 14. In the manufacturing, of the stator coil 14, first, the segment coil 20 is manufactured. In order to manufacture the segment coil 20, first, a coil material is cut to a predetermined length (S10). The coil material is a long rectangular conductor coated with an insulating film. The coil material is cut to a length needed for the segment coil 20. At this time, the end portions of the segment coil 20 are cut so as to have a desired shape, that is, to have an arc shape at a first end in the width direction.

The insulating film is peeled off from the end portions of the segment coil 20 (S12). When the insulating film can be peeled off, the recess portion 32 is formed in the surface that serves as the joining surface 30, of the first peeled portion 26a and the second peeled portion 26b (S14). The recess portion 32 can be formed by, for example, cutting, laser processing, or the like. Next, the segment coil 20 is primarily bent so as to have a U-shape (S16). The primary bending can be realized, for example, by pressing the segment coil 20 against a predetermined die or by bending it using a dedicated roller.

When the primary bending processing is completed on the segment coil 20, subsequently, the obtained segment coil 20 is assembled to the stator core 12 (S18). That is, the straight portions 24 are inserted into the slots 16 of the stator core 12. Then, portions of the straight portions 24, which protrude from the first end in the axial direction of the stator core 12, are secondarily bent in the circumferential direction in order to form a coil end (S20). Then, the first peeled portion 26a of the first segment coil 20a is overlapped with the corresponding second peeled portion 26b of the second segment coil 20b in the thickness direction.

When the above state is obtained, the first peeled portion 26a and the second peeled portion 26b overlapping each other in the thickness direction are joined to each other with laser welding (S22). That is, a laser light is emitted toward the first peeled portion 26a and the second peeled portion 26b overlapping each other in the thickness direction from the outside in the axial direction, so that the materials of the first peeled portion 26a and the second peeled portion 26b are melted and joined to each other. At this time, the output of the lases light is adjusted such that the reaching end portion of the laser energy capable of melting the material in the joining surface 30 is in the vicinity of the recess portion 32. Then, in this way, the shape of the joining boundary on the joining surface 30 is controlled by the recess portion 32. As a result, the stress intensity factor of the joining boundary becomes small, and thus the joining strength between the first segment coil 20a and the second segment coil 20b can be maintained at a high level.

All the steps other than the step (S14) of forming the recess portion 32 are steps adopted in the manufacturing process of the related art as well. In other words, the stator coil 14 of this embodiment is obtained solely by adding the step of forming the recess portion 32. That is, according to the manufacturing method of this embodiment, as described above, the joining strength of the coil can be greatly improved as compared with the related art, while the amount of change in the manufacturing procedure can be reduced.

Figure 11:
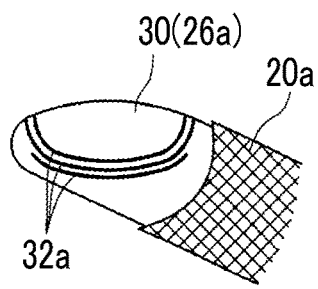
FIG. 11 is a diagram showing another example of a recess portion.

The configuration described so far is an example, and other configurations may be appropriately changed as long as the recess portion 32 is provided in the joining surface 30 of the first peeled portion 26a. For example, in the above description, solely one recess portion 32 is provided. However, the number of the recess portions 32 may be plural. For example, as shown in FIG. 11, a plurality of buffer grooves 32a functioning as the recess portions 32 may be arranged in the axial direction (that is, a direction parallel to the optical axis of the laser light). As described above, the buffer grooves 32a (the recess portions 32) are arranged in the axial direction, so that the amplitude of the reaching end portion of the laser energy, which does not enter into one buffer groove 32a, can enter into another buffer groove 32a. In this way, even in a case where the amplitude of the variation in the reaching depth of the laser energy is large, the joining boundary can be appropriately controlled, and thus the joining strength can be maintained at a higher level.

Figure 12:
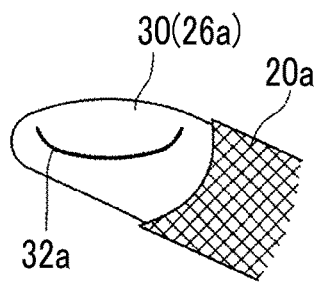
FIG. 12 is a diagram showing another example of the recess portion.

The recess portion 32 does not need to extend to the end portion of the first peeled portion 26a, and as shown in FIG. 12, a gap may be present between each of both ends of the buffer groove 32a functioning as the recess portion 32 and the upper end edge of the first peeled portion 26a. By making the buffer groove 32a have a shape in which the buffer groove 32a does not reach the end portion of the first peeled portion 26a, it is possible to suppress a decrease in strength due to the buffer groove 32a.

Figure 13:
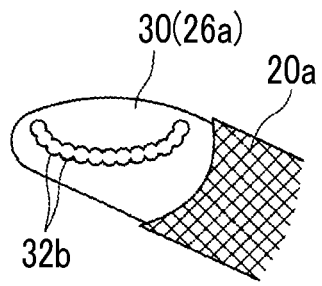
FIG. 13 is a diagram showing another example of the recess portion.

In the above description, the recess portion 32 is made to be a groove having a constant width. However, the recess portion 32 may be a small recess portion that does not have a groove shape. Then, a plurality of small recess portions may be provided such that the small recess portions are arranged at intervals or without an interval along the joining boundary. In FIG. 13, a plurality of circular small recess portions 32b (the recess portions 32) is arranged without an interval along the joining boundary. With the configuration as described above, it is possible to widen the width of the recess portion 32, and thus it is possible to more reliably absorb variation in the reaching depth of the laser energy.

Figure 14:
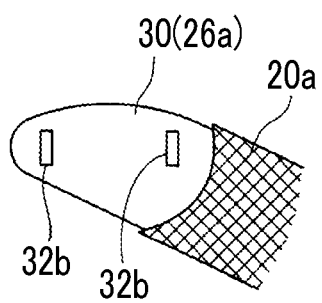
FIG. 14 is a diagram showing another example of the recess portion.
Figure 15:
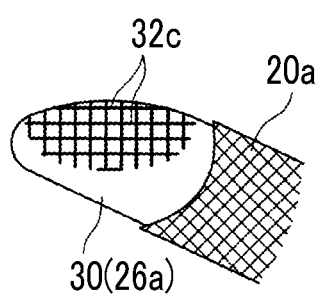
FIG. 15 is a diagram showing another example of the recess portion.

The recess portion 32 does not need to extend linearly. For example, as shown in FIG. 14, the recess portion 32 may include two small recess portions 32b provided to be separated from each other. The small recess portion 32b as described above may be provided, for example, in a place where stress acting on the first peeled portion 26a easily concentrates. The recess portion 32 may have a plurality of grooves 32c arranged in a lattice pattern, as shown in FIG. 15. By forming the grooves 32c in a lattice pattern, it is possible to reduce both the unevenness in the longitudinal direction and the unevenness in the lateral direction of the joining boundary. By forming the grooves 32c in a lattice pattern, the material melted under the laser energy easily stays in the grooves 32c without dropping down.

Figure 16:
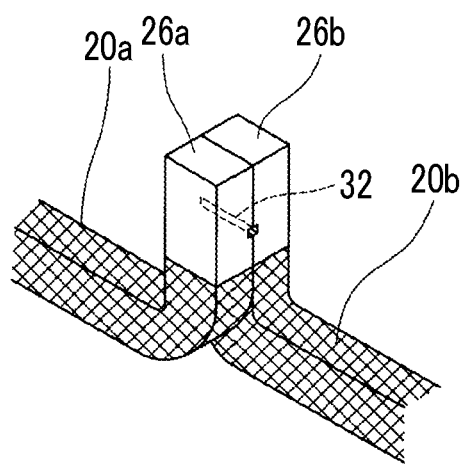
FIG. 16 is a diagram showing an example of another stator coil.

In the above description, the edges of the first peeled portion 26a and the second peeled portion 26b, which are located on the outer side in the axial direction during the laser welding, have an arc shape. However, the shapes of the first peeled portion 26a and the second peeled portion 26b may be appropriately changed. For example, as shown in FIG. 16, a configuration may be made in which the first peeled portion 26a and the second peeled portion 26b are bent outward in the axial direction in a state of having a rectangular shape and in this state, the first peeled portion 26a and the second peeled portion 26b are welded to each other. Even the case described above, the recess portion 32 is provided in the joining surface 30 of the first peeled portion 26a, which faces the second peeled portion 26b. The shape of the recess portion 32 is not particularly limited. However, for example, the recess portion 32 can be made to be a groove extending in a direction crossing the axial direction, as shown by a broken line in FIG. 16. In the above description, a case of performing welding with laser welding has been described as an example. However, the segment coil may be welded in other forms.

The embodiment of the disclosure has been described in detail above. However, the disclosure is not limited to the embodiment described above, and various modifications or changes can be made within the scope of the gist of the disclosure as stated in the claims.

What is claimed is:

1. A stator of a rotary electric machine, the stator comprising:
   a stator core; and
   a stator coil wound around the stator core, wherein:
   the stator coil includes a first segment coil and a second segment coil;
   a first peeled portion that is present in an end portion of the first segment coil is joined to a second peeled portion of the second segment coil;
   at least one recess portion is provided in a joining surface of the first peeled portion that faces the second peeled portion; the joining surface includes:
   a joining region is where the first segment coil is joined to the second segment coil; and
   a non-joining region is where the first peeled portion and the second peeled portion face each other without joining of the first segment coil and the second segment coil; and
   wherein the recess portion is present in a vicinity of a joining boundary that is a boundary between the joining region and the non-joining region, the recess portion includes an elongated shape and a width of the recess portion is shorter than a length of the joining region in a width direction of the recess portion.

2. The stator according to claim 1, wherein the joining region is located further on an outside of the stator coil than the non-joining region in an axial direction of the stator.

3. The stator according to claim 2, wherein the recess portion has a linear or arc shape and extends in a direction crossing the axial direction.

4. The stator according to claim 3, wherein a plurality of the recess portions is provided in the joining surface, and the recess portions are provided such that the recess portions are arranged at intervals in the axial direction.

5. The stator according to claim 1, wherein at least one recess portion is present in a surface of the second peeled portion that faces the recess portion of the first peeled portion.

6. The stator according to claim 1, wherein the first peeled portion and the second peeled portion are joined by laser welding.

7. The stator according to claim 1, wherein the recess portion is formed by a cutting or a laser processing.

8. The stator according to claim 1, wherein the joining boundary between the joining region and the non-joining region has a plurality of peaks with an amplitude and the width of the recess portion is near to the amplitude of the joining boundary.

9. A method of manufacturing a stator coil, the method comprising:
   forming a first peeled portion at an end portion of a first segment coil that is included in the stator coil and also forming at least one recess portion in the first peeled portion, an insulating film of the first segment coil that is peeled off in the first peeled portion; and
   welding the first peeled portion to a second peeled portion such that the recess portion faces the second peeled portion, in a state where the first peeled portion overlaps the second peeled portion at a joining surface of the first peeled portion that faces the second peeled portion, the second peeled portion being at an end portion of a second segment coil that is included in the stator coil,
   wherein a joining region is where the first segment coil is joined to the second segment coil, and a non-joining region is where the first peeled portion and the second peeled portion face each other without joining of the first segment coil and the second segment coil; and the recess portion is present in a vicinity of a joining boundary that is a boundary between the joining region and the non-joining region, the recess portion includes an elongated shape and a width of the recess portion is shorter than a length of the joining region in a width direction of the recess portion.

10. The method according to claim 9, wherein the first peeled portion and the second peeled portion are welded to each other with laser welding.

11. The method according to claim 10, wherein:
in the laser welding, a laser light has laser energy that melts materials of the first peeled portion and the second peeled portion; and
the recess portion is formed in a vicinity of an end portion of a range of each of the first peeled portion and the second peeled portion, and the laser energy reaches the range of each of the first peeled portion and the second peeled portion.

12. The method according to claim 10, wherein in the laser welding, a laser light is emitted from an outside of the stator coil in an axial direction of a stator to which the stator coil is assembled, and oscillated so as to repeatedly straddle a boundary where the first peeled portion and the second peeled portion overlap each other.

13. A stator of a rotary electric machine, the stator comprising:
a stator core; and
a stator coil wound around the stator core, wherein:
the stator coil includes a first segment coil and a second segment coil;
a first peeled portion that is present in an end portion of the first segment coil is joined to a second peeled portion of the second segment coil;
at least one recess portion is provided in a joining surface of the first peeled portion that faces the second peeled portion; and
a plurality of recess portions formed in the joining surface of the first peeled portion.

14. The stator according to claim 13, wherein:
the joining surface includes
a joining region where the first segment coil is joined to the second segment coil, and
a non-joining region where the first peeled portion and the second peeled portion face each other without joining of the first segment coil and the second segment coil; and
the recess portion is present in a vicinity of a joining boundary that is a boundary between the joining region and the non-joining region.

15. The stator according to claim 14, wherein the joining region is located further on an outside of the stator coil than the non-joining region in an axial direction of the stator.

16. The stator according to claim 15, wherein the recess portion has a linear or arc shape and extends in a direction crossing the axial direction.

17. The stator according to claim 16, wherein and the recess portions are provided such that the recess portions are arranged at intervals in the axial direction.

18. The stator according to claim 13, wherein at least one recess portion is present in a surface of the second peeled portion that faces the recess portion of the first peeled portion.

19. The stator according to claim 13, wherein the first peeled portion and the second peeled portion are joined by laser welding.

* * * * *

UNITED STATES PATENT AND TRADEMARK OFFICE
CERTIFICATE OF CORRECTION

PATENT NO. : 10,978,925 B2  
APPLICATION NO. : 16/209409  
DATED : April 13, 2021  
INVENTOR(S) : Nishimura et al.

Page 1 of 1

It is certified that error appears in the above-identified patent and that said Letters Patent is hereby corrected as shown below:

In the Specification

In Column 7, Line(s) 12, delete "hear" and insert --heat--, therefor.

In Column 10, Line(s) 2, delete "are" and insert --arc--, therefor.

In Column 10, Line(s) 35, delete "lases" and insert --laser--, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*